US006337800B1

(12) United States Patent
Chang

(10) Patent No.: US 6,337,800 B1
(45) Date of Patent: Jan. 8, 2002

(54) ELECTRONIC BALLAST WITH INDUCTIVE POWER FEEDBACK

(75) Inventor: Chin Chang, Yorktown Heights, NY (US)

(73) Assignee: Philips Electronics North American Corporation, New York, NY (US)

( * ) Notice: Subject to any disclaimer, the term of this patent is extended or adjusted under 35 U.S.C. 154(b) by 0 days.

(21) Appl. No.: 09/516,173

(22) Filed: Feb. 29, 2000

(51) Int. Cl.$^{7}$ .......................... H02M 5/45; H05B 37/02

(52) U.S. Cl. ..................................... 363/37; 315/209 R

(58) Field of Search ............................. 363/16, 17, 34, 363/37, 95, 97, 131, 132; 315/209 R, 219, 224, 291, 307, DIG. 5

(56) References Cited

U.S. PATENT DOCUMENTS

| | | | | |
|---|---|---|---|---|
| 5,223,767 A | | 6/1993 | Kulka | 315/209 |
| 5,313,142 A | * | 5/1994 | Wong | 315/205 |
| 5,387,848 A | | 2/1995 | Wong | 315/224 |
| 5,400,241 A | | 3/1995 | Bergervoet | 363/132 |
| 5,459,651 A | | 10/1995 | Maehara | 363/34 |
| 5,596,247 A | | 1/1997 | Martich | 315/56 |
| 5,608,295 A | | 3/1997 | Moisin | 315/247 |
| 5,686,799 A | | 11/1997 | Moisin et al. | 315/307 |
| 5,757,140 A | * | 5/1998 | Nilssen | 315/209 R |
| 5,757,143 A | * | 5/1998 | Martucci et al. | 315/247 |
| 5,764,496 A | | 6/1998 | Sato et al. | 363/37 |
| 5,771,159 A | | 6/1998 | Sako et al. | 363/17 |
| 5,798,617 A | | 8/1998 | Moisin | 315/247 |
| 6,051,936 A | * | 4/2000 | Qian | 315/224 |

FOREIGN PATENT DOCUMENTS

| | | |
|---|---|---|
| DE | 4137207 A1 | 5/1993 |
| EP | 0697803 A2 | 2/1996 |

OTHER PUBLICATIONS

PHA 23,611, U.S. Ser. No. 09/222,904, Filed: Dec. 30, 1998
PHA 23,861, U.S. Ser. No. 09/455,128, Filed: Dec. 6,1999
PHA 23,618, U.S. Ser. No. 09/245,757, Filed: Feb. 8,1999

* cited by examiner

*Primary Examiner*—Matthew Nguyen
(74) *Attorney, Agent, or Firm*—David R. Treacy; Laurie E. Gathman

(57) ABSTRACT

A low frequency to high frequency power converter having a power feedback network from a high frequency voltage source to the low frequency input to a DC supply circuit for the high frequency voltage source. The network forms part of a feedback path which has an inductive impedance at one or more frequencies within the operational range of the high frequency source. In a fluorescent lamp ballast embodiment, feedback is from a load connection point through a path having at least an inductor and a capacitor in series. A low pass filter input to the DC supply circuit may have a shunt capacitor across the rectifier input. The feedback network may include a capacitor in series with the parallel combination of an inductor and a capacitor. In another embodiment the feedback inductor is a tapped inductor connected to the rectifier input, its two inductor portions having mutually exclusive periods of zero current flow.

20 Claims, 10 Drawing Sheets

ELECTRONIC BALLAST WITH INDUCTIVE POWER FEEDBACK

CROSS-REFERENCE TO RELATED APPLICATIONS

U.S. patent application Ser. No. 09/222,904 filed Dec. 30, 1998 by Jinron Qian for Electronic Lamp Ballast through Line Inductor with Power Feedback to AC-side.

U.S. patent application Ser. No. 09/245,757 filed Feb. 8, 1999 by Jinron Qian and Gert Bruning for Electronic Lamp Ballast with Power Feedback through Line Inductor.

U.S. patent application Ser. No. 09/455,128 filed Dec. 6, 1999, 1999 by Chin Chang for Electronic Ballasts with Current and Voltage Feedback Paths.

STATEMENT REGARDING FEDERALLY SPONSORED RESEARCH OR DEVELOPMENT

Not Applicable

BACKGROUND OF THE INVENTION

The invention relates to electronic ballasts for operating discharge lamps such as fluorescent lamps at a high frequency, and in particular to such ballasts having a minimum number of active components.

Most lamp ballast inverters are manufactured in large quantities for sale in a highly competitive market, so that reliability and cost are primary considerations. Half-bridge inverters are widely used because they have a relatively low parts count and high efficiency. A particularly effective type of electronic ballast, or converter, has a load circuit using a resonant inductor or transformer having a linear core, generally together with MOSFET switches (metal oxide silicon field effect transistors). In this context a linear core is one in which under all normal operating conditions a significant increase in magnetizing current will be accompanied by a significant increase in flux level. However, because of the switching action of the diodes and inverter transistors, the circuit operation is only piecewise linear during different stages of high frequency and line voltage cycles.

Many circuit modifications have been proposed to improve line current power factor while keeping lamp current crest factor within acceptable limits. For example, it is known to vary inverter frequency during each cycle of the low frequency input power. Most early proposals for improved performance of electronic ballasts have involved substantial additional circuitry, but in the last ten years a number of relatively simple high frequency power feedback circuits have been developed to cause the rectifier diodes for the DC bus supplying the inverter to conduct over substantially the entire low frequency cycle. In general, these feedback circuits either couple some or all of the load current to one of the inverter terminals, or couple a high frequency voltage from the inverter or load circuit through a feedback capacitor to one of these terminals.

However, with known power feedback circuits, the lamp ballast designer has been forced to make undesirable trade-offs between lamp crest factor, line current power factor, and circuit cost and complexity. A further complicating factor is the desirability to save power by dimming the lamps when less lamp brightness is needed.

Examples of power feedback are shown in U.S. Pat. No. 5,608,295, where a voltage, equal to the voltage across a resonant capacitor C8 plus a portion of the lamp voltage across a matching transformer, is fed through a capacitor 2A to one input terminal of a voltage doubler power supply. The tap 1T is at a location along the winding such that the voltage has a greater amplitude than the input line voltage so that during a part of each high frequency cycle one or the other of the rectifier diodes conducts. FIG. 1 shows a full bridge rectifier embodiment, with similar feedback to a node between two capacitors C2A and C2B in series across the line input to the bridge.

Feedback of this type has the disadvantage that, if inverter frequency is raised in order to dim the lamp, or rises as a result of removal of the lamp (or removal of a lamp in a multiple lamp arrangement), the feedback increases and tends to increase the DC bus voltage. This increases the stress on all the components, and reduces reliability or increases cost because the components have higher ratings than would otherwise be required.

BRIEF SUMMARY OF THE INVENTION

An object of the invention is to provide a low frequency to high frequency converter for driving a variable load, which avoids DC bus over-boosting at light loads.

Another object of the invention is to provide such a converter for use as a fluorescent lamp ballast.

Yet another object of the invention is to provide a fluorescent lamp ballast which avoids overboosting if frequency is raised for dimming purposes.

According to the invention, a high frequency power converter includes a DC supply circuit which receives low frequency power, through an input network, from a source of low frequency voltage. A bulk storage capacitor circuit maintains the DC voltage from the supply circuit substantially constant during a cycle of the low frequency line voltage. A high frequency voltage source is connected to receive power from that DC voltage. A feedback network is connected between the high frequency voltage source and a node at the low frequency power side of the DC supply circuit. This network forms part of a feedback path which has an inductive impedance at one or more frequencies within the operational frequency range of the high frequency source.

A power converter according to this general description has the advantage that, at higher than normal operating frequencies within a range of the voltage source operation, the total impedance in the feedback path increases. This characteristic may reduce excessive DC bus voltage during operation with no load or reduced load. Additionally, with respect to harmonics of the high frequency of the voltage source, inductive feedback causes the feedback current to be more sinusoidal than with capacitive feedback. As a result, the input capacitor across the low frequency power source to the rectifier may be smaller.

In a first preferred embodiment, the high frequency voltage source is a connection to a load circuit supplied from the output of a half-bridge inverter. Still more preferably, the load circuit includes a resonant inductor and connection points for a load, the feedback network being connected to receive a voltage proportional to the load voltage.

In a fluorescent lamp ballast according to this first embodiment of the invention, the fluorescent lamp is connected to the load connection points, directly or through a matching transformer. The matching transformer may be a step-up transformer having a high output voltage. A resonant capacitor is connected in parallel with the lamp, and/or a small capacitor may be connected in series with the lamp. The use of the step-up transformer enables operation of more than one lamp without need for a special selective starting circuit, so long as each lamp has its own series capacitor.

In lamp ballasts according to the invention, line current waveform is less impacted by frequency modulating to improve crest factor, than if feedback is purely capacitive. In a further preferred embodiment of a lamp ballast, the feedback network includes a capacitor in series with the parallel combination of an inductor and a capacitor. Thus in this embodiment the inductive impedance in the feedback path is located in the feedback network. Preferably, the input network is a low pass filter having at least one capacitor connected to an AC input terminal of the DC supply circuit. The DC supply circuit is a bridge rectifier, and the network is connected between a load connection point and the AC-input node between two of the diodes. This embodiment has the particular advantage that current through the diodes can be balanced.

In a variation of this embodiment, a similar feedback network is connected to a node between two capacitors which are in series across the low frequency input to the rectifier circuit.

In a second preferred embodiment, the input network comprises two inductive elements magnetically coupled in series, one end of one of the inductive elements being connected to an input terminal of the rectifier. The feedback network is formed by a capacitor connected between the load circuit and the junction or node between the inductive elements. Thus in this embodiment inductive impedance in the feedback path is located in the input network. A lamp ballast with a resonant load circuit as described above, according to this embodiment, has the additional advantages that the peak currents through the rectifier diodes can be reduced, and there is more direct energy transfer through the feedback inductor to the load so that ballast efficiency is improved.

In a third embodiment, the feedback network is connected between the output of a half-bridge inverter and the node at the low frequency power side of the DC supply circuit. The feedback network may comprise simply an inductor and a capacitor in series.

In each of these embodiments, the inductance in the feedback network is much smaller than the resonant inductor or inductors customarily used in EMI networks, but is sufficiently large that the equivalent value of the impedance in the feedback path rises with frequency in at least a portion of the frequency range of the inverter during at least one operating mode, such as start-up, lamp dimming, or ballast operation with a lamp removed or non-operating. The actual values of inductance will be determined, of course, partly according to the designed load power, the normal operating frequency of the inverter, and the voltage of the low frequency power source.

DETAILED DESCRIPTION OF THE INVENTION

Figure 1:
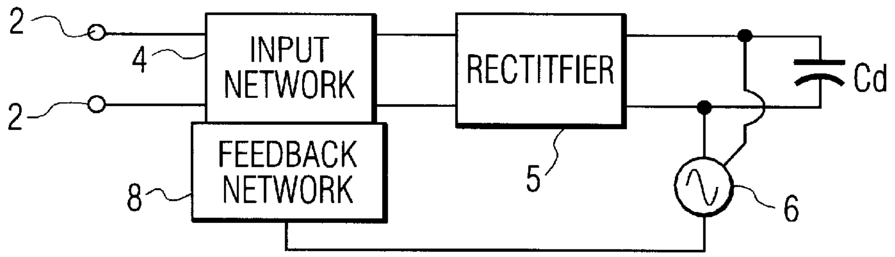
FIG. 1 is a generalized block diagram of a converter according to the invention.
Figure 2A:
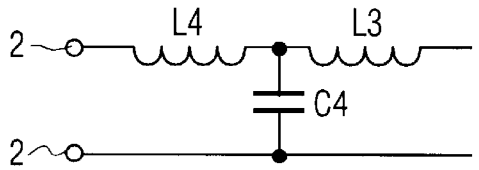
FIGS. 2*a*–2*d* are schematic diagrams of input networks useful in the converter of FIG. 1.
Figure 2B:
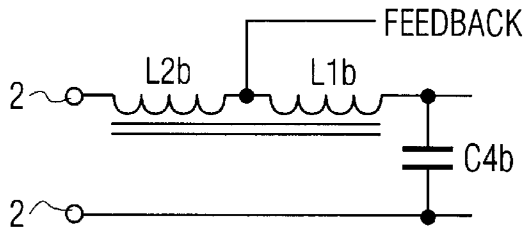
Figure 2C:
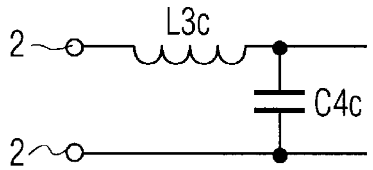
Figure 2D:
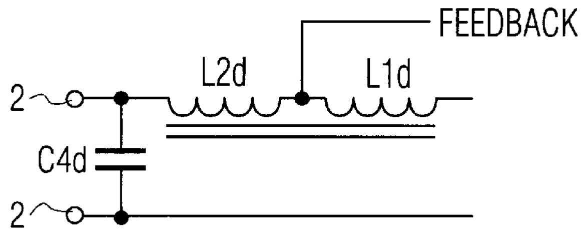

The generalized circuit of FIG. 1 according to the invention includes connection points 2 for a source of low frequency power, which are connected through an input network 4 to a rectifier 5. The input network 4 is preferably arranged as a low pass filter, and may further include an electromagnetic interference (EMI) filter at the low pass filter input. The DC output of the rectifier is connected to a DC storage capacitor Cd, and also provides power to a high frequency voltage source 6. A power feedback network 8 is connected between the source of high frequency voltage and the input network 4, the feedback network 8 and input network 4 together forming a power feedback path which is inductive at least at one frequency within the operational range of the source 6.

Power feedback through a series LC circuit to the AC-side of the rectifier in a fluorescent lamp ballast has been shown in FIG. 15 of U.S. Pat. No. 5,764,496, but the circuits shown in that patent function quite differently from those disclosed herein, and with poorer performance. An important difference is that this patent emphasizes use of only a small DC bus capacitor so that input line current is more sinusoidal, in conjunction with a complex valley fill-in circuit to maintain the minimum DC bus voltage at an intermediate value. As a result the rectifier output dips greatly between line voltage peaks, and therefore the lamp crest factor could much higher. The operational principles of both circuits are much different. In the '496 patent the valley filling scheme provides most of the power factor correction function, and the power feedback primarily provides DC boost. With inductive feedback as disclosed herein, the power feedback provides the function of power factor correction.

Figure 3:
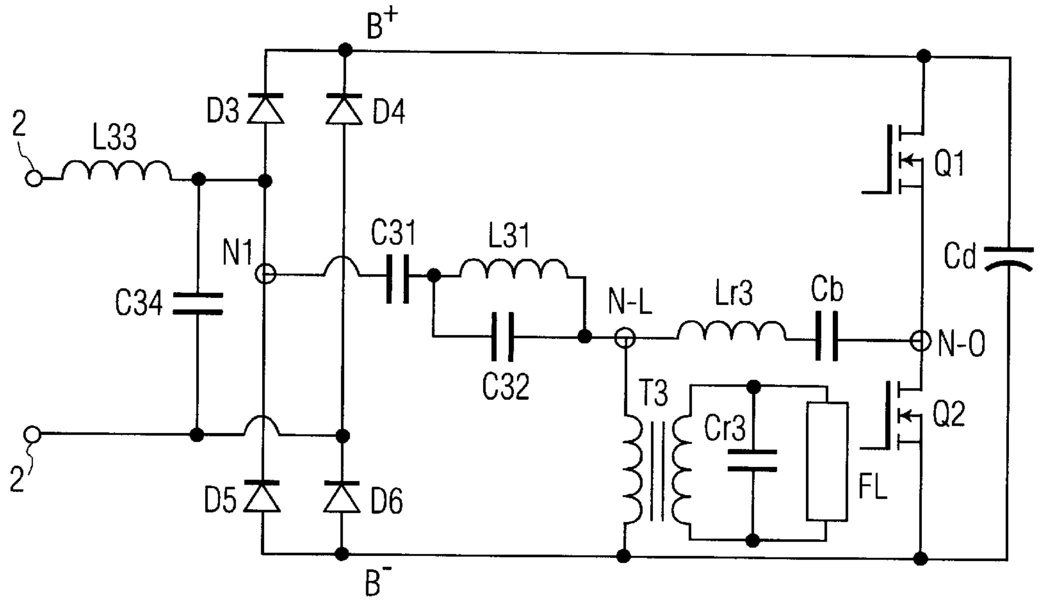
FIG. 3 is a schematic diagram of a first lamp ballast embodiment of the invention, having a complex impedance in a feedback connection to a rectifier input node.

In accordance with the invention, the input network may have many different forms, such as those shown in any of FIGS. 2*a*–2*d*, and will usually also contain an EMI (electromagnetic interference) filter network (not shown) connected to the points 2. EMI filters have such a low shunt impedance to converter high frequencies that they usually do not affect the power feedback path except to act as a short circuit across points 2. When used with the input network of FIG. 2*d* the EMI filter capacitor will be separated from the points 2 by the filter inductor. In each of these input networks the important characteristic is that the input (shunting) capacitor C4, C4*b*, C4*c* and C4*d* is smaller than those commonly used for EMI filtering so that a substantial voltage, at the frequency of inverter operation, appears across it, and it plays a role in energy transfer during a portion of each high frequency cycle. The series inductors L3 and L4, L1*b*/L2*b*, and L3*c* have an inductance chosen such that they also play a role in energy transfer during a portion of each high frequency cycle. Their inductance is generally less than approximately 200 μh, which is much smaller than that in EMI filters which typically are at least 2 mh and often larger. A first practical embodiment of the circuit of FIG. 1 is shown in FIG. 3.

Diodes D3–D6 form a full wave bridge rectifier of the usual form, whose output is a DC voltage between positive and negative buses $B^+$ and $B^-$. A bulk storage capacitor Cd connected between these buses keeps this voltage substantially constant over a full cycle of the low frequency source. The high frequency voltage source includes a half-bridge inverter formed by transistors Q1 and Q2 connected in series. These transistors are switched alternatively on and off by control circuits of any well known type, and may be either self-oscillating or be switched at a controlled frequency.

The load circuit is of a common arrangement, and includes a DC blocking capacitor Cb, having one terminal connected to the output node N-O of the inverter, whose capacitance is sufficiently large that it has no significant effect on the circuit resonant frequency. A resonant inductor Lr3 is connected between the capacitor Cb and a load connection point N-L, which is one end of the primary winding of a matching transformer T3 whose other end is connected to the negative DC bus B–. A resonant capacitor Cr3 and a fluorescent lamp FL are connected in parallel across the secondary winding of the transformer, so that the resonant inductor Lr3 and resonant capacitor Cr3 are effectively connected in series. Following common practice, the transformer T3 provides an optimum match for the lamp operating voltage, and isolation between the lamp terminals and the low frequency power source.

In accordance with the invention, a partially inductive feedback network is formed by feedback capacitor C31, in series with an inductor L31 in parallel with a capacitor C32. The feedback network is connected between the load connection point N-L, and a node N1 at the AC-side of the rectifier between diodes D3 and D5. An input network formed by a series inductor L33, and a shunt capacitor C34 across the low frequency AC input to the rectifier between node N1 and the junction between diodes D4 and D6, forms part of the feedback path during certain portions of the high frequency cycle. As will be explained later, lamp dimming is possible by raising inverter frequency with less increase in lamp crest factor or increase in line current harmonics than with capacitive feedback.

Figure 4:
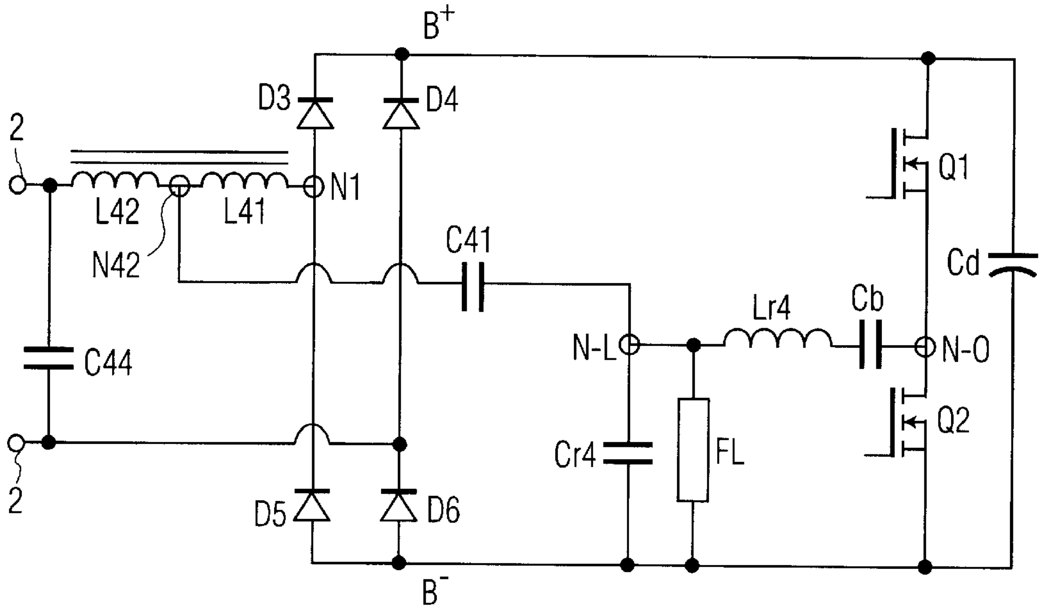
FIG. 4 is a schematic diagram of a second lamp ballast embodiment of the invention, having a complex impedance in a feedback path including an inductance between the low frequency input and a rectifier input node.

The embodiment of FIG. 4 has a lower parts count than that of FIG. 3. The matching transformer T3 is not shown in the tested circuit, but would probably be required for a practical, commercial ballast by safety regulations unless the lamp and ballast are integral. Except for the feedback and input networks, the other parts have similar functions and may have similar component values. Here feedback is through a feedback capacitor C41 to a node N42 which is the tap between two tightly coupled inductance coils L41 and L42 on a common core. For example, L41 and L42 each have an individual magnetizing inductance of 10 μh, while the leakage inductance is desirably less than 0.5 μh. The inductors L41 and L42 thus have a combined inductance of approximately 40 μh. Capacitor C44 forms part of the feedback path during portions of the high frequency cycle. This embodiment utilizes a lower inductance L41/L42 than inductor L31, so that there is more direct energy transfer through the inductor to the lamp load. If an EMI filter is connected between points 2, it is desirable that the EMI inductor be between the input network and any EMI shunt capacitor. Diode peak currents are less than with the circuit of FIG. 3.

Figure 5:
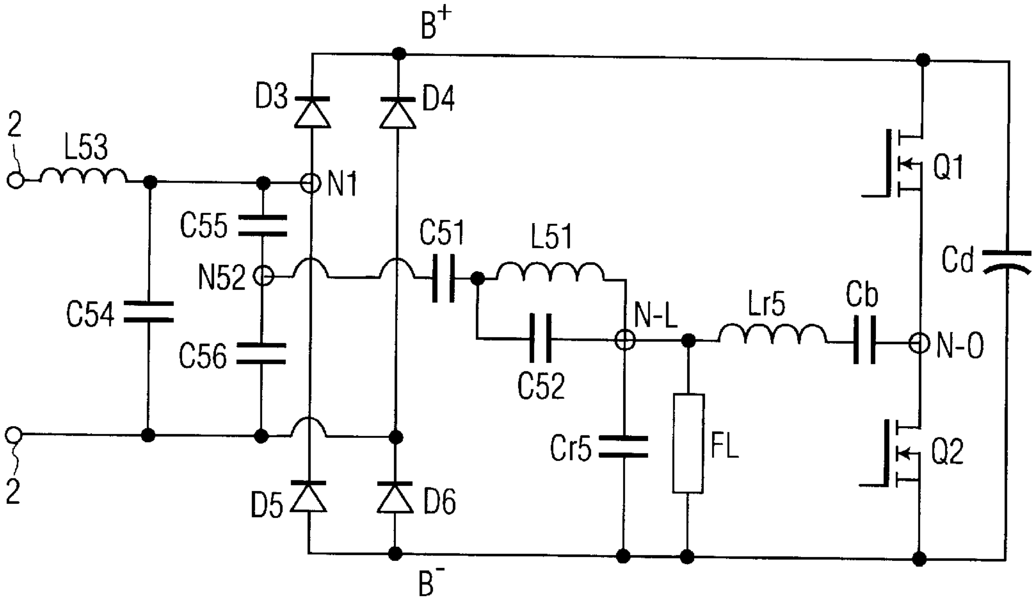
FIG. 5 is schematic diagram of a variation of the ballast of FIG. 3.

The circuit of FIG. 5 is basically like that of FIG. 3, except for deletion of the matching transformer, and a difference in the feedback network connection to the input network. Here feedback is to a node N52 between capacitors C55 and C56 which are in series between node N1 and the other low frequency input to the rectifier. With this embodiment the load circuit current is further balanced, and lamp current crest factor is improved.

Figure 6:
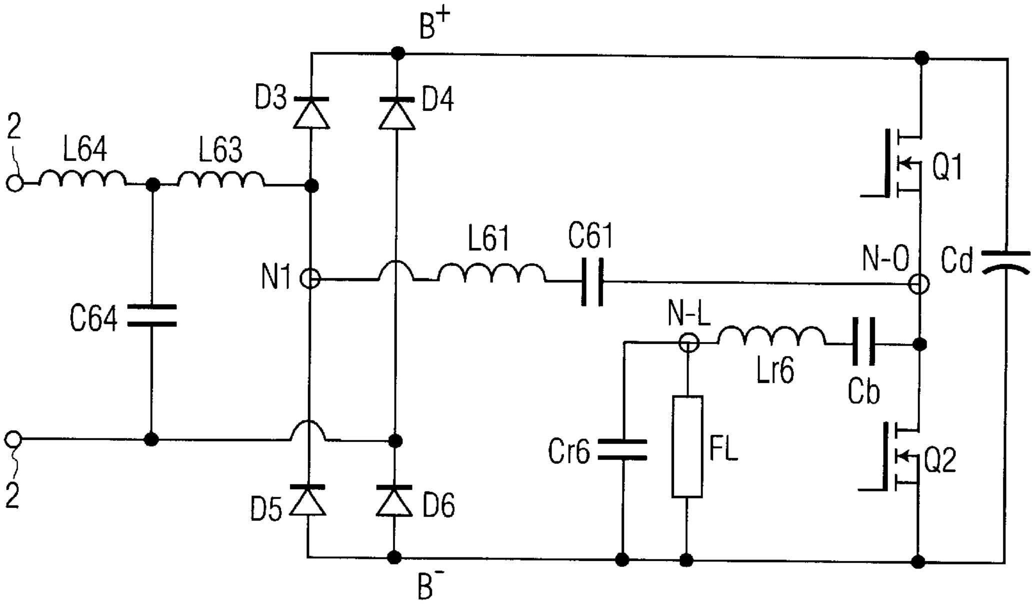
FIG. 6 is a schematic diagram of a third lamp ballast embodiment of the invention, having a complex impedance in a feedback path including an inductance between the inverter output and a rectifier input node.

In the embodiment of FIG. 6, power feedback is directly from the inverter. Compared to the circuit of FIG. 3, feedback from the inverter has the disadvantage that current through the switching transistors is higher, so that efficiency is lower. However, lamp current crest factor is better, and the circuit of FIG. 6 further reduces overboosting in the event of lamp removal.

Figure 7:
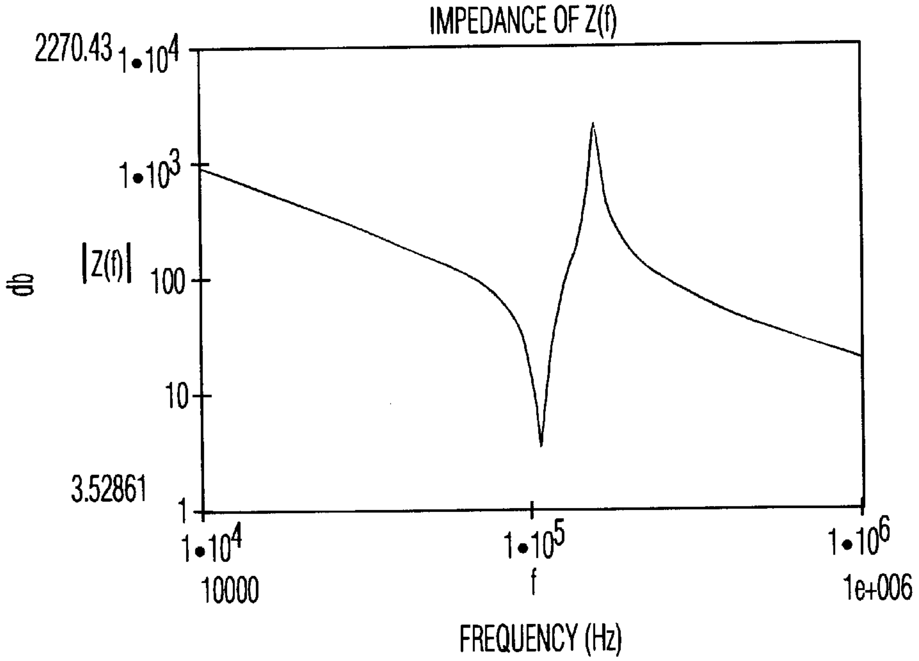
FIG. 7 is a Bode plot of an exemplary power feedback path impedance.

In the circuits of FIGS. 3 and 5, design and understanding of the feedback network itself is simplified. FIG. 7 shows the variation of impedance of the network formed by L31, C31 and C32. It can be seen that the series resonance point is well above the normal operating frequency, such as 60 kHz, while the parallel resonance at which feedback is minimized is more than twice that frequency.

If the circuit operates around 60 kHz in normal full load conditions, the equivalent impedance Z of the feedback network is capacitive. If, however, the switching frequency is raised higher to around 120 kHz, the equivalent impedance of the feedback network is inductive and is much higher. Therefore the power feedback action is weakened, the input power is reduced, and the circuit energy is better balanced. This shows that this feedback structure has two major benefits: added freedom in shaping input line current waveform for power factor correction, and reduced DC bus voltage at light load conditions such as pre-heating (arc has not yet struck) or lamp dimming by inverter frequency increase. During a warm-up period in which the arc of the lamp FL has not struck, or if it has burned out or is removed from its connection points, the inverter frequency will often be increased by the control circuit if the inverter is not self-oscillating. If the inverter is a self-oscillating type, the inverter frequency circuits are designed to increase the frequency during lamp warm-up or removal. Because the feedback is inductive, the boost of DC bus voltage over the peak of the low frequency line voltage will increase only slightly.

Figure 8:
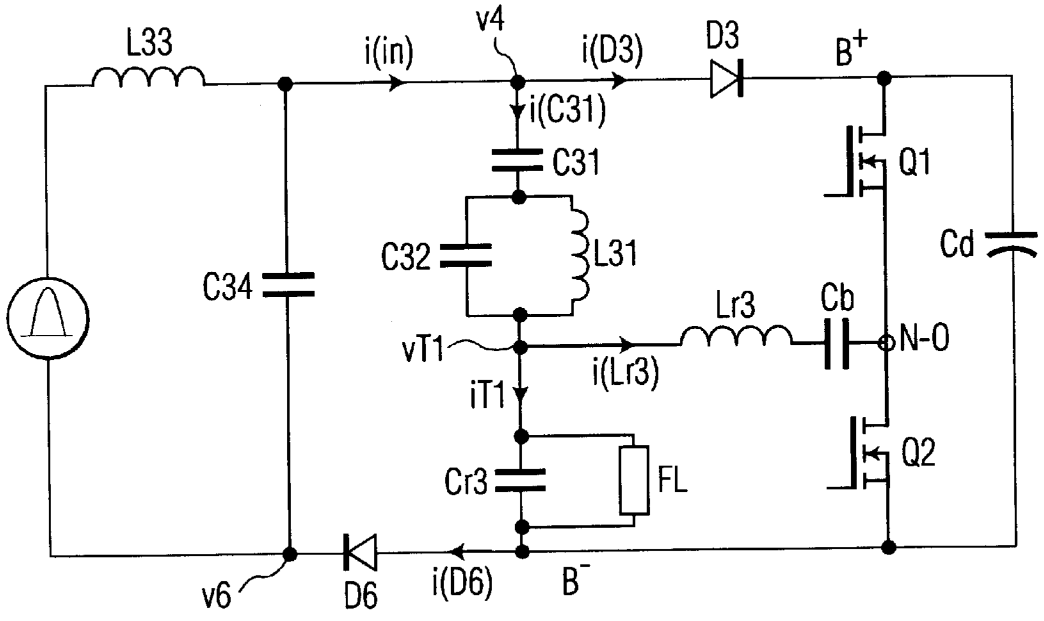
FIG. 8 is an equivalent circuit of the circuit of FIG. 3 when the input voltage is in a positive half cycle of the low frequency.
Figure 9A:
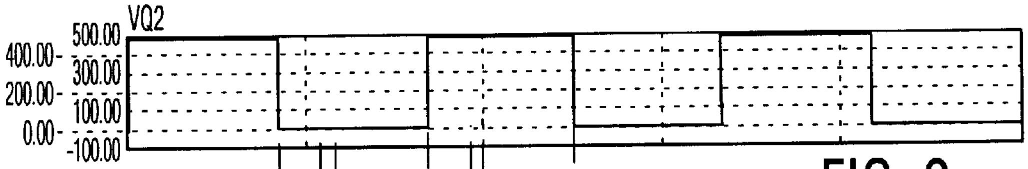
FIG. 9 is a plot of current and voltage waveforms for the circuit of FIG. 8, FIGS. 10*a*–10*f* are simplified circuits corresponding to FIG. 8 during successive intervals of one high frequency cycle.
Figure 9B:
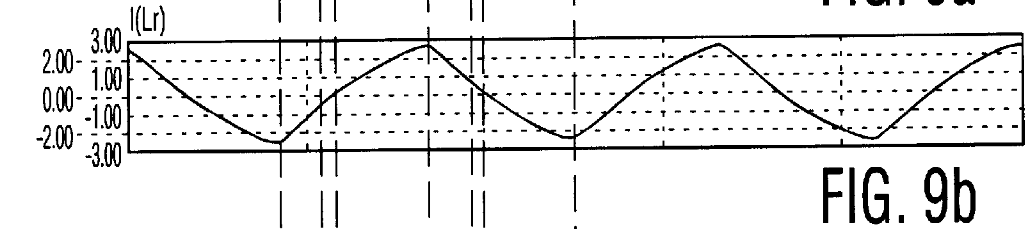
Figure 9C:
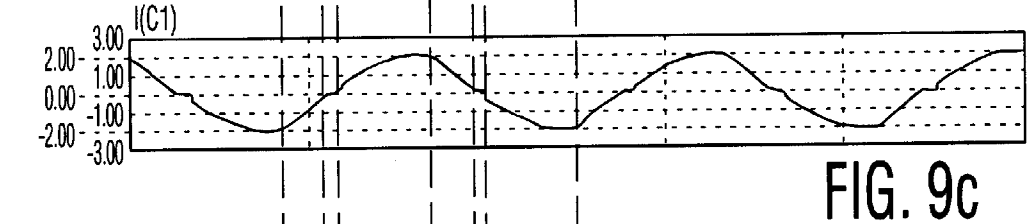
Figure 9D:
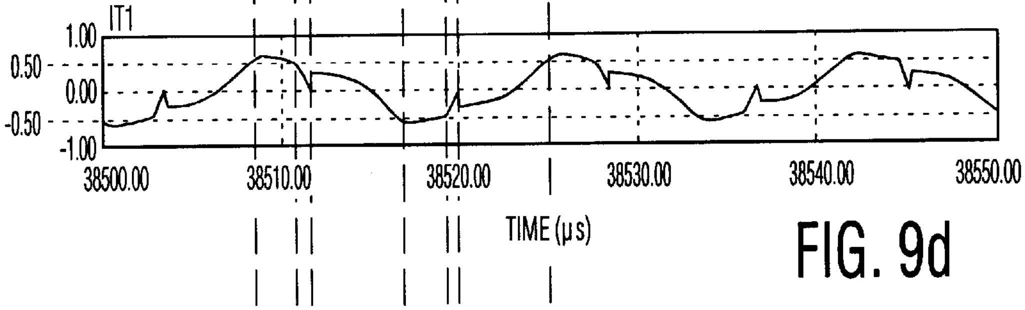
Figure 9E:
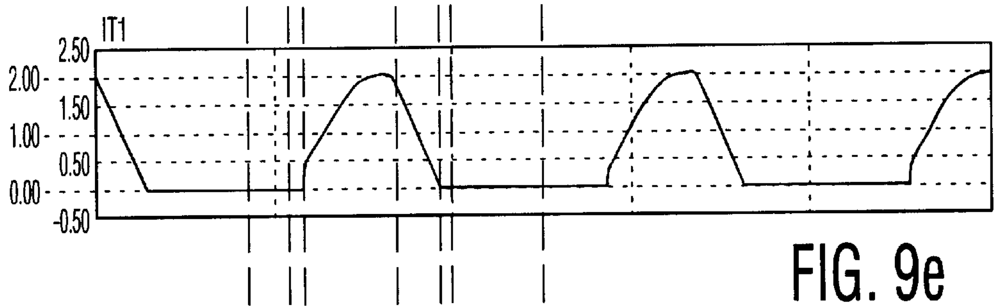
Figure 9F:
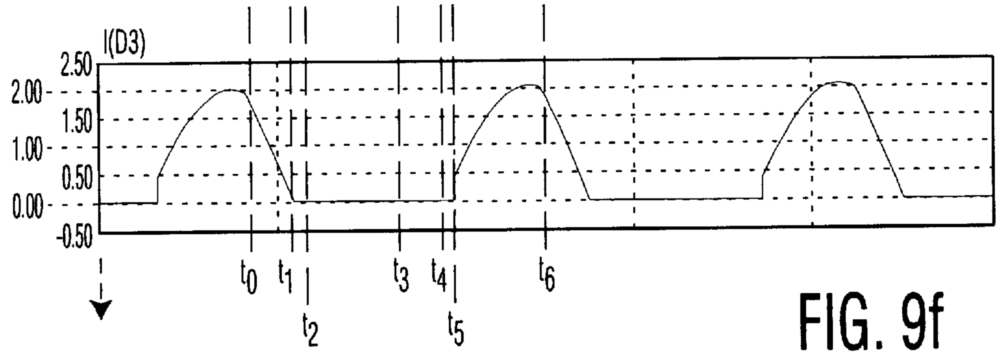
Figures 9G, 9H, 9I, 9J, 9K:
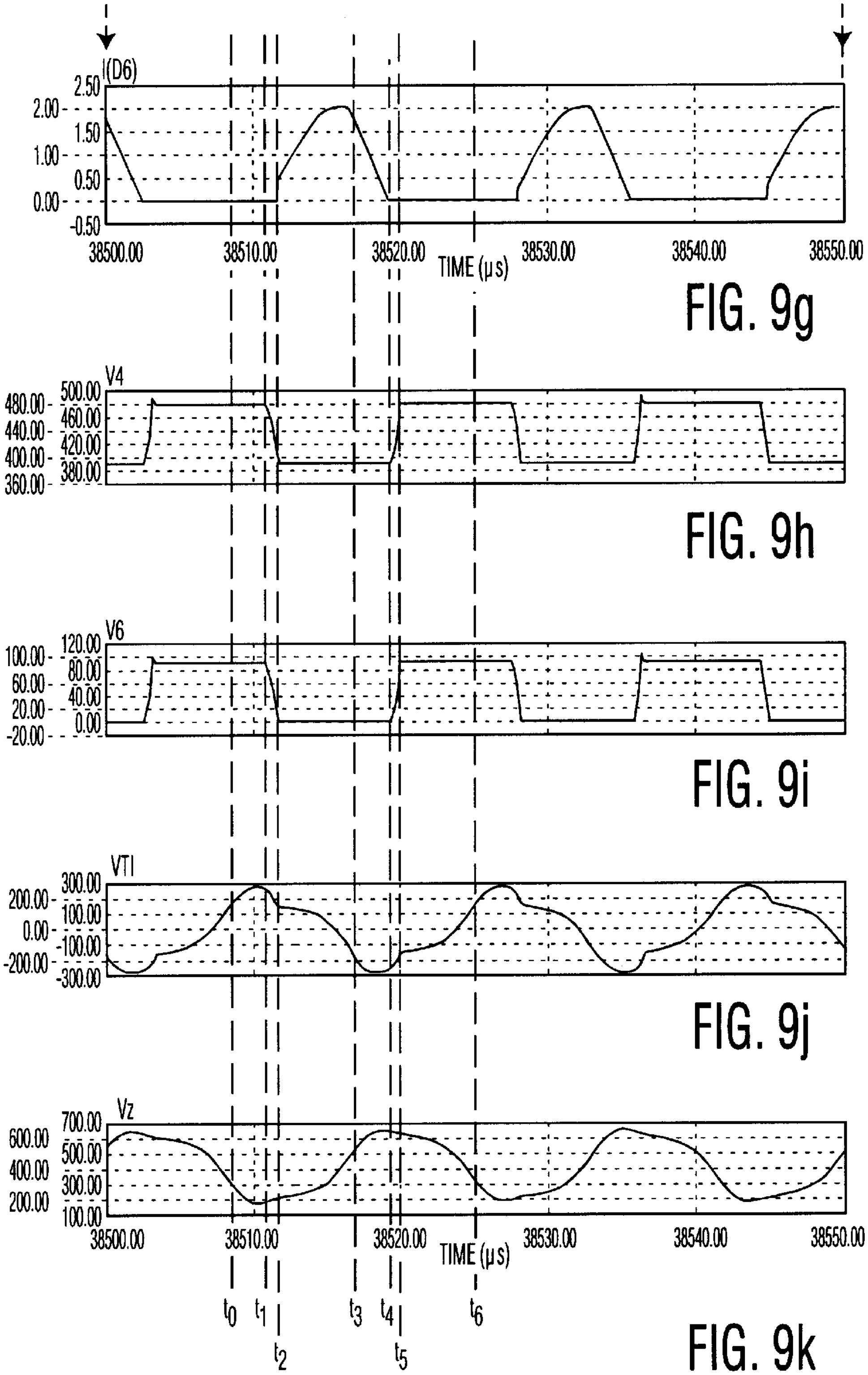
Figure 10A:
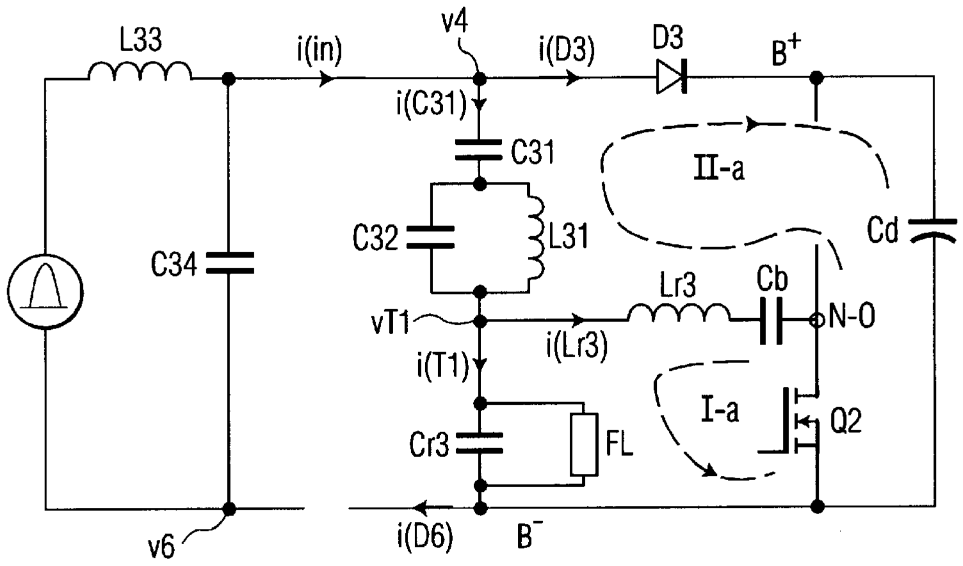
Figure 10B:
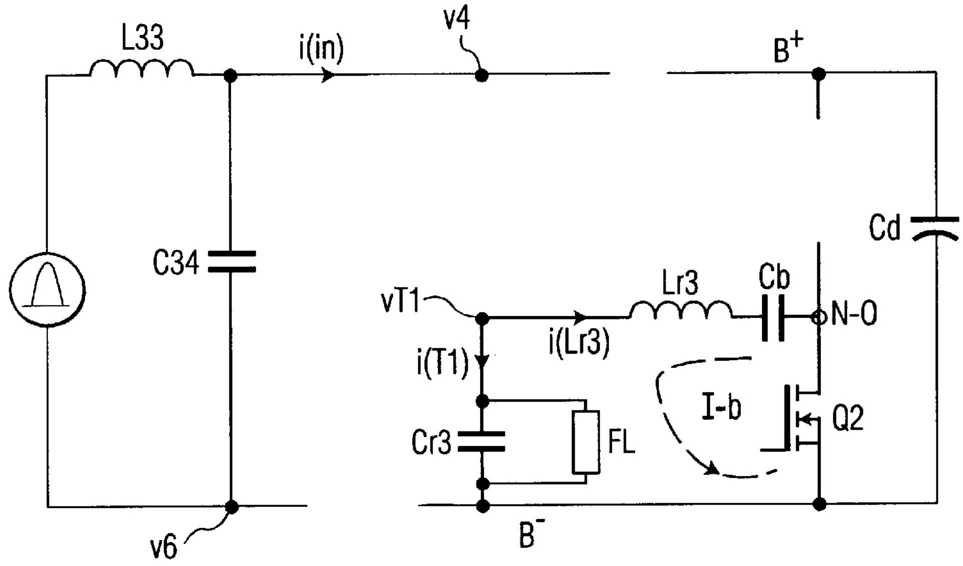
Figure 10C:
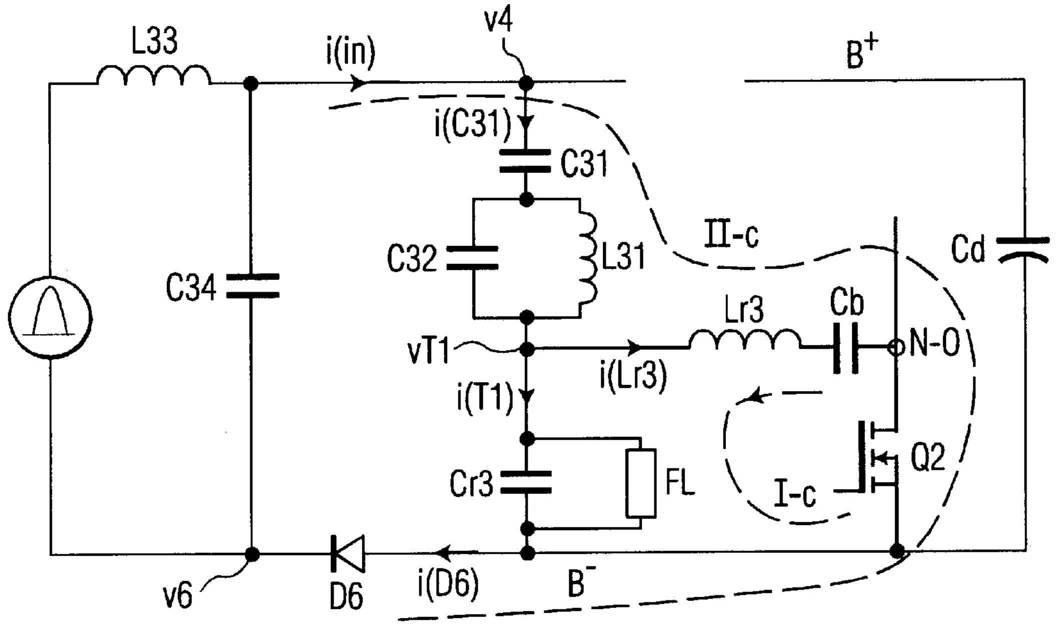
Figure 10D:
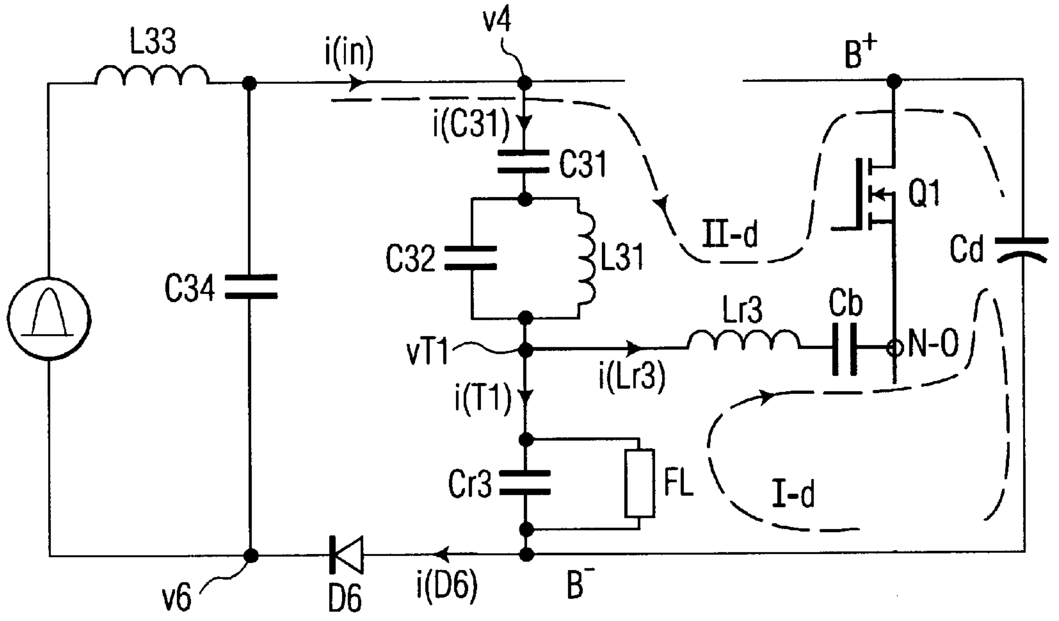
Figure 10E:
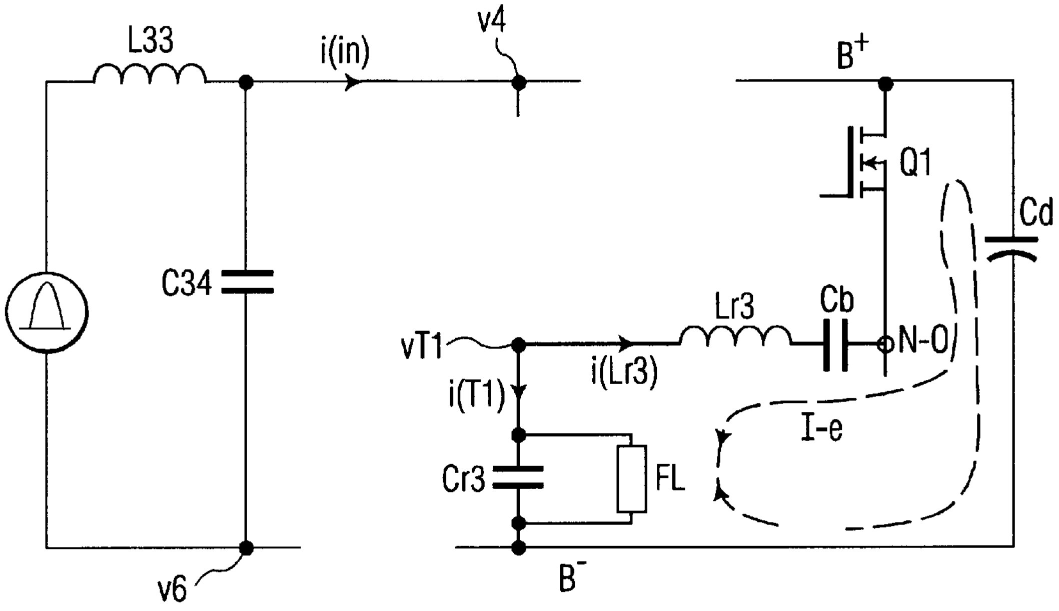
Figure 10F:
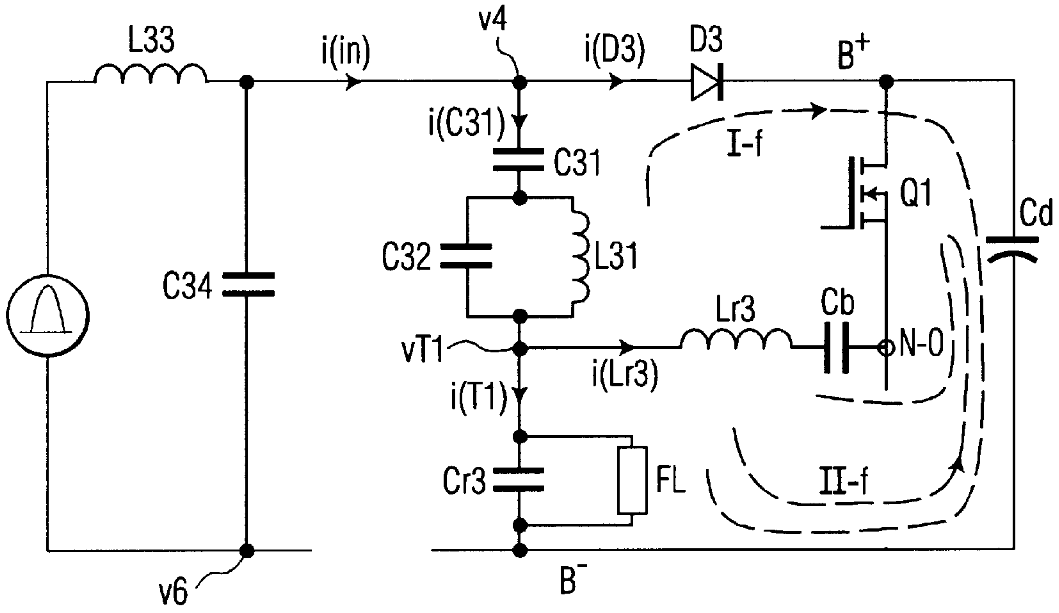

Analysis of the operation of the circuit of FIG. 3 is simplified if an equivalent circuit is studied. Operation is symmetrical for both positive and negative half cycles of the low frequency power, except for the paths through the rectifier circuit. When the low frequency voltage is near its peak, conduction occurs only through two of the four diodes. FIG. 8 shows an equivalent circuit for this situation, which is useful for simulating performance of the actual circuit. Because of the wide frequency difference between the low frequency input power and the high switching frequency, during one high frequency cycle there is virtually no change in the input voltage across the connection points 2.

The voltage and current waveforms of FIG. 9 reflect operation of the circuit of FIG. 8 with the input line at approximately 90% of its peak value, and a test circuit having the following component values:

Cb 1 μf

Cd 68 μf

Cr 1.6 nf
C31 18 nf
C32 15 nf
FL 500 Ω
Lr3 0.6 mh
L31 68 μh
Switching frequency 60 kHz The voltage vN-O across transistor Q2 shows the effect of the controlled switching frequency. The peak value equals the voltage across the bulk storage capacitor, about 490 volts. The next 5 curves are currents i(Lr3) through the resonant inductor Lr3, i(C31) through the feedback capacitor C31, i(T1) to the combination of load and resonant capacitor Cr3, i(in) coming from the input network to the node Ni, and i(D3) flowing through one diode.

The next curve, current i(D6), is identical to i(in) during this portion of the low frequency cycle. The last four curves are voltages: v4, the voltage (with respect to the $B^-$ bus) at node N1; v6, the voltage across diode D6; vT1, the voltage at node N-L; and vZ, the voltage across the feedback network.

These curves show that at this input voltage level, operation for the duration of one high frequency cycle can be divided into 6 intervals, starting at $t_0$ when transistor Q2 is turned on, and respectively ending at $t_1$ when i(D3) has fallen to zero, and D3 turns off; $t_2$ when D6 starts to conduct; $t_3$ when transistor Q2 is turned off; $t_4$ when i(D6) has fallen to zero, and diode D6 turns off; $t_5$ when diode D3 starts to conduct; and $t_6$ when at Q2 is turned on again. During each of these intervals because of diode or transistors being on or off, different current paths can be identified as shown in FIGS. 10*a*–10*f*.

Before $t_0$, diode D3 is conducting but i(in) is zero and diode D6 is strongly reverse biased. Transistor Q1 is turned on and Q2 is turned off. The resonant inductor current i(Lr3) is increasing negatively toward its maximum.

At time $t_0$ the transistor states are switched, Q2 turning on and Q1 off. As a result, the (negative) current i(Lr3) flows through the body diode of transistor Q2 and starts to decrease. The energy in the resonant inductor is transferred to the load via the loop I-a shown in FIG. 10*a*, and stored energy in the feedback network is transferred to the bulk storage capacitor Cd via the loop II-a. The current i(C31) decreases almost linearly. During interval 1 the voltage vT1 across the dummy load and resonant capacitor Cr3 reaches its maximum of about 300 volts, while the voltage vZ across the feedback network reaches a low of about 200 volts. During this time the gate voltage of Q2 is turned on, but current continues to flow through its body diode in the directions shown for loops I-a and II-a. Diode D6 remains strongly reverse biased, and therefore is omitted from this figure. When i(C31) reaches zero, interval 1 ends at time $t_1$.

At time $t_1$, the beginning of interval 2, diode D3 prevents reversal of current through C31. During this interval the absolute value of i(Lr3) (negative) equals i(T1) (positive) and each drops toward zero. The voltage vT1 across capacitor Cr and the load decreases, and as a result the reverse voltage v6 drops rapidly to zero. The transfer of energy from the resonant inductor to the load and resonant capacitor which started during interval 1 is completed via loop I-b during this interval The feedback network current i(C31) remains zero, so that vZ increases only slightly due to circulating tank current in L31 and C32 (as shown in FIG. 9, at about 230 volts for the component values selected). The end of this interval is time $t_2$ when i(T1) and i(Lr3) reach zero and diode D6 begins to conduct.

At time $t_2$ there is a sudden small increase in currents i(in), i(D6) and i(T1). As shown in FIG. 10(*c*) current i(in) from the input network directly charges the feedback network and the resonant tank via loop II-c. During this interval i(in) and i(C31) reach their maximum values of about 2 amp. Via loop I-c current i(Lr3) through the resonant inductor becomes positive and starts to increase. The effect is that the load and tank each absorb energy from the line, through the feedback network. This interval ends when at time $t_3$ the transistors are switched. The instant of this switching defines the maximum positive current i(Lr3) at a value of about 2.5 amp.

Starting at time $t_3$ the current from the input network i(in) flows through the feedback network as i(C31); its value drops almost linearly toward zero, while the voltage vZ across the feedback network rises to its maximum of about 670 volts and then falls slightly. This is the result of the complex impedance of the feedback network. While the voltage change across C32 approaches zero as i(C31) approaches zero, the voltage across the tank circuit formed by L31 and C32 continues to fall. The current i(Lr3) decreases from its maximum. During interval 4, as shown in FIG. 10(*d*) energy flows from the input network via loop II-d, and from the resonant inductor via loop I-d, through the body diode of transistor Q1 to charge the bulk capacitor Cd. At time $t_4$ the currents i(C31) and i(D6) reach zero, and the reverse voltage v6 starts to rise.

Like interval 2, interval 5 is quite short. Resonant inductor current i(Lr3) and the negative current i(T1) are equal and opposite, continue to drop toward zero, and reverse just before $t_5$. Energy transfer from the resonant inductor Lr3 to the storage capacitor Cd continues via loop I-e, and reverses when the resonant inductor current i(Lr3) reverses. There is no current through the feedback network, and vZ drops slightly due to its circulating tank current, at approximately 640 volts. Because of current flow through the inductor L33, the voltage v4 across C34 and the voltage v6 across diode D6 rise rapidly to their maximum values. When v4 reaches the value of the voltage on the bulk storage capacitor Cd, time $t_5$ is reached and diode D3 begins to conduct.

During interval 6, capacitor C31 discharges through diode D3, while the current i(T1) equals current flow to (charging) or from (discharging) the bulk storage capacitor Cd. During part of this interval some energy stored in the feedback network Z is transferred into storage capacitor Cd via path I-f. At the same time energy from capacitor Cd flows through transistor Q1 into inductor Lr3 via path II-f, as the current i(Lr3) increases to its maximum in the negative direction. These opposite energy flows cause i(T1) to increase from a small negative value toward its positive maximum. As a result capacitor Cd sees a net discharge during this interval, while the load is driven by an equivalent resonant sub-circuit consisting of Lr3, Cr3 and the feedback network Z.

Those of ordinary skill will recognize that the corresponding circuit for negative line half cycles will be comparable, and will operate during equivalent intervals showing the same magnitudes and corresponding patterns of current and energy transfer. However, small differences in circuit values may affect the exact timing of many of the current changes without departing from the basic principle of the invention. At different times in the input low frequency voltage cycle (different instantaneous input voltage compared with its peak value), the durations of intervals may change and even the number of intervals may change. Again, the operating principles will remain unchanged.

In general, for a power converter according to the invention, over one high frequency cycle the input current i(in) is quite discontinuous but unidirectional. Its average value, over one high frequency cycle, will vary approximately proportionally with the instantaneous value of low frequency input voltage, so that the line current, after typical EMI filtering, will have a very high power factor and low harmonics.

Figure 11:
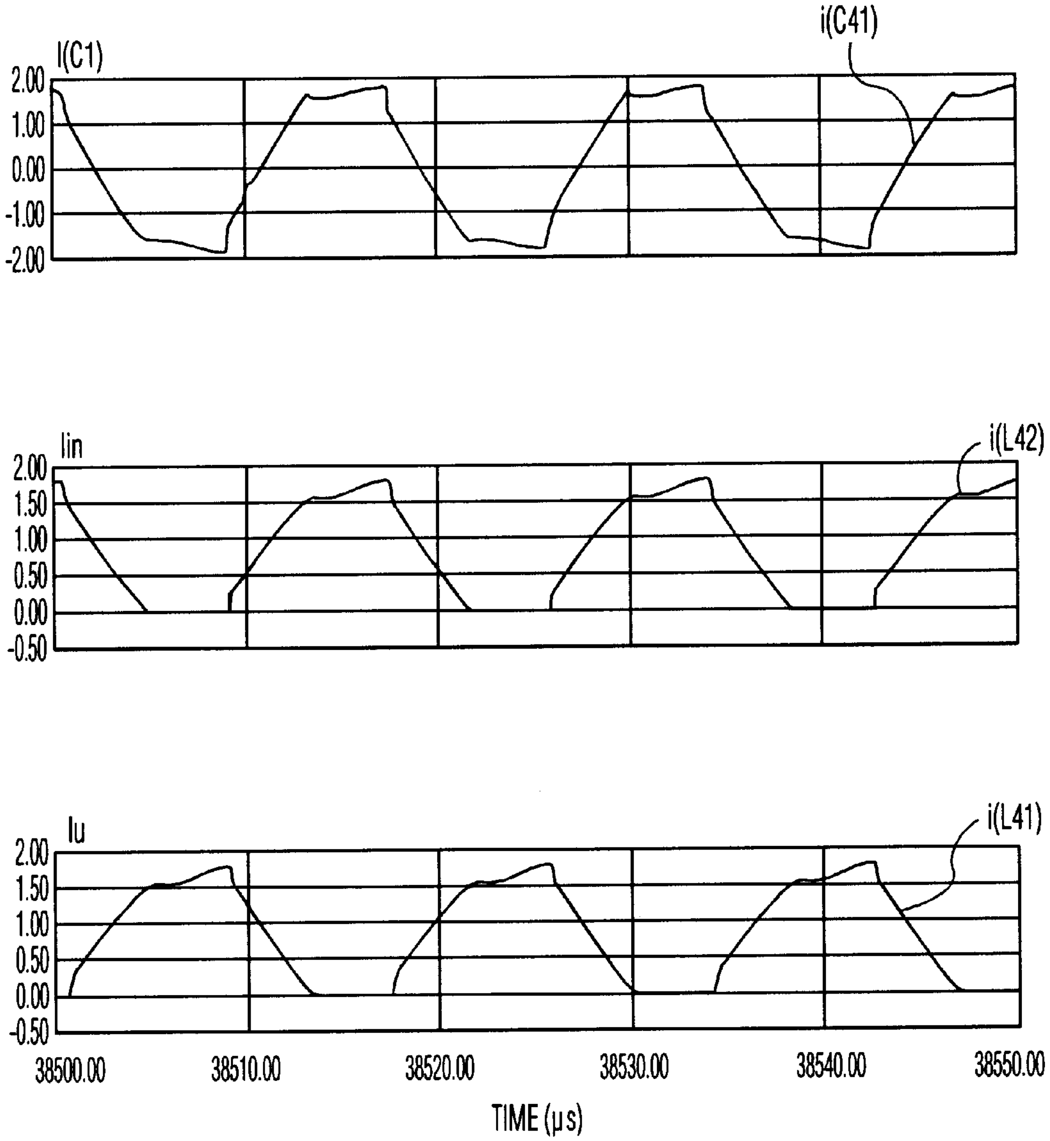
FIG. 11 is a plot of current waveforms for the embodiment of FIG. 4, showing currents through the input/feedback inductor.

Currents in the feedback network and input network for another preferred embodiment are shown in FIG. 11. This embodiment, shown in FIG. 4, has been tested using a step-up transformer between node N-L and the negative bus to supply capacitor Cr4 and a parallel load. The circuit had the following component values:

Cb 1 μf
Cd 68 μf
Cr 1.6 nf
C41 22 nf
Lr4 0.6 mh
L41 10 μh (magnetizing inductance)
L42 10 μh (when considered separate from L41)
L41/L42 leakage inductance approximately 0.5 μh
FL 500 Ω(load resistor).

The capacitance of the input capacitor C44 is not critical, but is preferably small enough so that some high frequency voltage appears across it. The feedback network current i(C41) is positive from the inductance toward capacitor C41. The current i(L42) is positive from connection point 2 and capacitor C44 into L42. The current i(L41) is positive from the inductance toward node N1. It can be seen that during one interval of time the input current i(L42) is zero, while the current i(L41) into the rectifier has its highest values. Similarly, for an approximately equal period of time, the rectifier current (diode D3 when the low frequency line is positive) is zero, while the input current has its highest values and is all flowing through the feedback network.

Comparing FIGS. 9 and 11, it will be seen that the diode D3 current flows less than half the time in the embodiment of FIG. 3, while it flows for about ¾ of the time in the embodiment of FIG. 4. Thus the peak diode current and diode heating are significantly reduced when feedback is to the tapped input inductor.

Comparing these component values with those of FIG. 8 (or 3) one can also see that there is a significant reduction in the network inductances, as well as fewer capacitors. Where FIG. 3 has a 68 μh feedback inductor and a separate input inductor L33, FIG. 4 needs only one inductor, effectively a center-tapped 40 μh coil having a high permeability toroidal core so that leakage is low.

It will be clear that many variations of the circuits disclosed can be devised, which will operate in accordance with the principles of the invention. For example, the source of high frequency voltage for feedback need not be like those shown in FIGS. 3–6, but may have a differently configured load circuit resulting in a different pattern of conduction intervals during one high frequency cycle. The inverter can be self-oscillating, using any known circuit for frequency control, or may be driven by a fixed frequency source, or one controlled in response to some desired operating condition, or circuit operating parameters. The rectifier circuit might be a voltage doubler. The diodes D3–D6 shown are fast recovery diodes, but ordinary diodes can be used if a fast recovery diode is incorporated in each DC bus.

What is claimed is:

1. A low frequency to high frequency power converter comprising:

a source of low frequency voltage, having two source connection points between which the low frequency voltage is maintained, a DC supply circuit having at least two diodes and four terminals, two of said terminals being AC-side terminals, and two of said terminals being DC-side terminals, one of said diodes being connected between one of the AC-side terminals and one of the DC-side terminals, an input network connected in series between at least one of said source connection points and a first of said AC-side terminals, a high frequency voltage source connected to receive power from said DC-side terminals, and bulk storage capacitor means for maintaining said DC voltage substantially constant during a cycle of the low frequency line voltage, characterized in that said converter further comprises a feedback network connected between said high frequency voltage source and a node at the AC-side of the DC supply circuit, said feedback network being part of a feedback path which has an inductive impedance at one or more frequencies within the operational frequency range of said high frequency voltage source.

2. A low frequency to high frequency power converter, comprising:

a source of low frequency voltage, having two source connection points between which the low frequency voltage is maintained, a DC supply circuit having at least two diodes and four terminals, two of said terminals being AC-side terminals, and two of said terminals being DC-side terminals, one of said diodes being connected between one of the AC-side terminals and one of the DC-side terminals, an input network connected in series between at least one of said source connection points and a first of said AC-side terminals, a high frequency voltage source connected to receive power from said DC-side terminals, and bulk storage capacitor means for maintaining said DC voltage substantially constant during a cycle of the low frequency line voltage, characterized in that said converter further comprises a feedback network connected between said high frequency voltage source and a node at the AC-side of the DC supply circuit, said feedback network being part of a feedback path which has an inductive impedance at one or more frequencies within the operational frequency range of said high frequency voltage source, and said feedback network includes a first capacitor in series with an inductor, and a second capacitor in parallel with said inductor.

3. A power converter as claimed in claim 1, characterized in that said input network comprises a low pass filter having a capacitor connected to at least one of said AC-side terminals.

4. A power converter as claimed in claim 1, characterized in that said feedback network includes a feedback inductor, having an inductance less than approximately 200 μh, connected between said high frequency voltage source and said input network.

5. A power converter as claimed in claim 4, characterized in that said input network comprises a low pass filter having a shunt capacitor connected to at least one of said AC-side terminals, the high frequency voltage source comprises a resonant load circuit, and said feedback network and said input network have values selected such that during one interval of a high frequency cycle there is no energy transfer from the input network to the feedback network, the high frequency voltage source or the bulk storage capacitor; and during another interval of said high frequency cycle energy transfer from the input network directly charges the feedback network and the resonant load circuit.

6. A power converter as claimed in claim 1, characterized in that said high frequency voltage source comprises:

a half-bridge inverter connected to receive DC voltage from said DC-side terminals, said inverter comprising two switches connected in series and having an output node between said switches for providing a high frequency voltage, and a load circuit carrying a first high frequency current and having an end connected to said output node.

said feedback circuit being connected to said output node.

7. A power converter as claimed in claim 6, characterized in that said feedback circuit consists of an inductor and a capacitor in series.

8. A low frequency to high frequency power converter comprising:

a source of low frequency voltage, having two source connection points between which the low frequency voltage is maintained, a DC supply circuit having at least two diodes and four terminals, two of said terminals being AC-side terminals, and two of said terminals being DC-side terminals, one of said diodes being connected between one of the AC-side terminals and one of the DC-side terminals, an input network connected in series between at least one of said source connection points and a first of said AC-side terminals, a high frequency voltage source connected to receive power from said DC-side terminals, and bulk storage capacitor means for maintaining said DC voltage substantially constant during a cycle of the low frequency line voltage, characterized in that said converter further comprises a feedback network connected between said high frequency voltage source and a node at the AC-side of the DC supply circuit, said feedback network being part of a feedback path which has an inductive impedance at one or more frequencies within the operational frequency range of said high frequency voltage source, and said input network comprises first and second inductors connected in series between one of said source connection points and said one of said AC-side terminals, said first and second inductors being coupled magnetically with negligible leakage inductance, and said node is a connection between said first and second inductors.

9. A power converter as claimed in claim 8, characterized in that said first and second inductors have a combined inductance less than approximately 200 $\mu$h.

10. A power converter as claimed in claim 8, characterized in that said feedback network consists of a capacitor, and said first and second inductors have a same inductance.

11. A power converter as claimed in claim 8, characterized in that said feedback network and said input network have values selected such that during one interval of a high frequency cycle there is no current flow through said first inductor, and during another interval of said high frequency cycle there is no current flow through said second inductor.

12. A power converter as claimed in claim 1, characterized in that said high frequency voltage source comprises:

a half-bridge inverter connected to receive DC voltage from said DC-side terminals, said inverter comprising two switches connected in series and having an output node between said switches for providing a high frequency voltage, and a load circuit carrying a first high frequency current and having an end connected to said output node, and a connection point for a load, said feedback circuit being connected to said connection point.

13. A power converter as claimed in claim 12, characterized in that said load circuit comprises a resonant inductor connected between said output node and said connection point for a load.

14. A power converter as claimed in claim 13, characterized in that said load is a fluorescent lamp, and the load circuit further comprises a resonant capacitor in parallel with said lamp.

15. A power converter as claimed in claim 14, characterized in that said lamp is connected to said load connection point through a matching transformer.

16. A power converter as claimed in claim 2 characterized in that said high frequency voltage source comprises:

a half-bridge inverter connected to receive DC voltage from said DC-side terminals, said inverter comprising two switches connected in series and having an output node between said switches for providing a high frequency voltage, and a load circuit carrying a first high frequency current and having an end connected to said output node, and a connection point for a load, said feedback circuit being connected to said connection point, said load is a fluorescent lamp, and said load circuit further comprises a resonant capacitor and a resonant inductor connected between said output node and said connection point for a load.

17. A power converter as claimed in claim 16, characterized in that said input network comprises a low pass filter having a shunt capacitor connected to said one of said AC-side terminals, and said shunt capacitor has a capacitance, and said feedback network has component values, selected such that the shunt capacitor is a source of energy transfer during a portion of a high frequency cycle, said portion being less than half a high capacitor is a source of energy transfer during a portion of a high frequency cycle, said portion being less than half a high frequency cycle.

18. A power converter as claimed in claim 16, characterized in that said input network comprises a shunt capacitor connected to said source connection points, and said feedback network and said input network have values selected such that during one interval of a high frequency cycle there is no energy transfer from the input network to the feedback network, the high frequency voltage source or the bulk storage capacitor; and during another interval of said high frequency cycle energy transfer from the input network directly charges the feedback network and the resonant load circuit.

19. A power converter as claimed in claim 13, characterized in that said input network comprises first and second inductors connected in series between one of said source connection points and said one of said AC-side terminals, said first and second inductors being coupled magnetically with negligible leakage inductance, and said node is a connection between said first and second inductors.

20. A power converter as claimed in claim 19, characterized in that said feedback network and input network have values selected such that during one interval of a high frequency cycle there is no current flow through said first inductor, and during another interval of said high frequency cycle there is no current flow through said second inductor.

* * * * *